July 7, 1925.  1,545,152
F. McCOLLUM, JR
CONNECTER FOR ANTISKID CHAINS
Filed Jan. 16, 1924
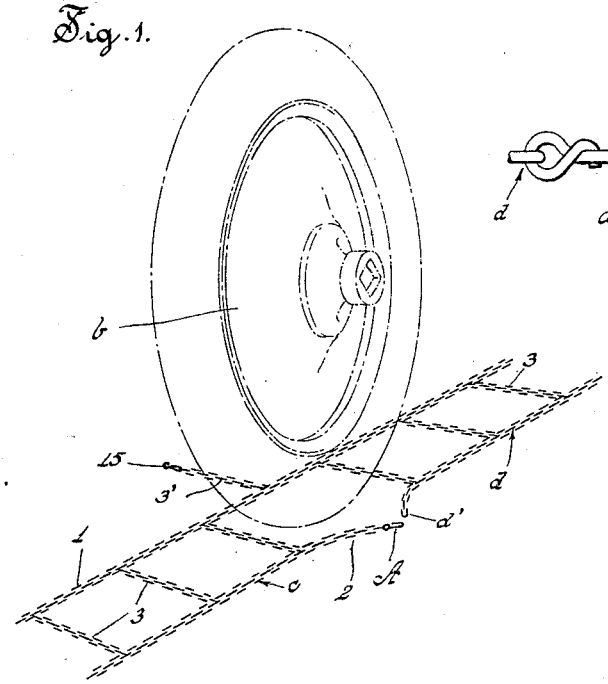
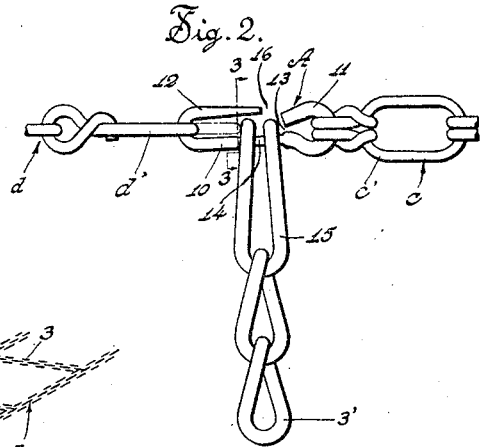
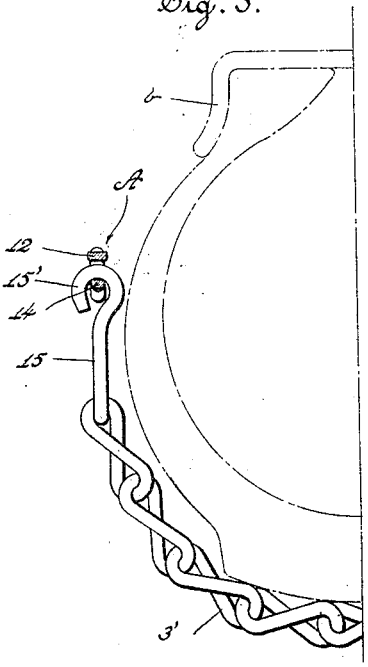
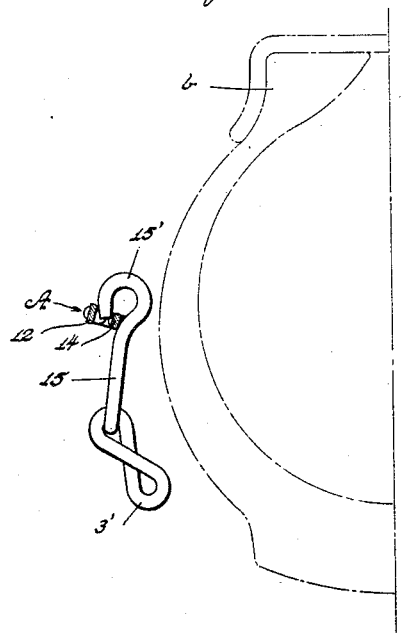
Inventor
Fenelon McCollum Jr.
By T. Clay Lindsey
His Attorney Patented July 7, 1925.

1,545,152

UNITED STATES PATENT OFFICE.

FENELON McCOLLUM, JR., OF MANSFIELD DEPOT, CONNECTICUT.

CONNECTER FOR ANTISKID CHAINS.

Application filed January 16, 1924. Serial No. 686,485.

*To all whom it may concern:*

Be it known that I, FENELON McCOLLUM, Jr., a citizen of the United States, and a resident of Mansfield Depot, in the county of Tolland, State of Connecticut, have invented certain new and useful Improvements in a Connecter for Antiskid Chains, of which the following is a specification.

The present invention relates to anti-skid chains of the sort disclosed in my co-pending application Serial No. 622,005, filed March 1st, 1923. My improved chain disclosed in said application comprises a pair of side chains, one of which is in two sections, a plurality of cross chains connecting the side chains, and a hook or the like for detachably joining together the two sections of the side chain and the end of one of the cross chains.

The present invention concerns, more particularly, the connecter for connecting together the parts of the separable side chain and the cross chain. The aim of the invention is to provide a connecter having various features of novelty and advantage and which is characterized by its extreme simplicity in construction, the economy with which it may be manufactured, the ease with which it may be applied to the chain parts, and the readiness with which the chain parts may be detached therefrom. Also, by the security with which the connecter holds the parts together.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the appended claims.

In the drawing forming a part of this specification and in which similar reference characters refer to similar parts, Figure 1 indicates the manner in which a chain provided with my improved connecter is placed on an automobile or similar wheel;

Fig. 2 is a side elevation of the connecter with portions of the chains connected thereto;

Fig. 3 is a sectional view taken substantially on line 3—3 of Fig. 2 and shows the relation of the connecter and the links associated therewith to an automobile tire when the chain is in place; and Fig. 4 is a view similar to Fig. 3, but illustrates the connecter as having been turned to a position where the link or hook of the cross chain can be disengaged therefrom.

Referring to the drawing in detail, and, more particularly, to Fig. 1, the anti-skid device or chain is shown as having a pair of side chains 1 and 2 which are adapted to extend circumferentially of the wheel $b$ at the sides of the tire. The side chains are connected by cross chains 3 which are composed of links of any suitable type. In the drawing, the links of the chains are shown more or less diagrammatically, it being understood that any suitable form of link may be employed. The side chains are provided at one end with the usual hooks for securing the ends of the chain together after the chain has been placed around the periphery of the tire. For the purpose fully described in my said co-pending application, one of the side chains is separable between its ends; that is, it is formed in two sections $c$ and $d$ which are detachably fastened together by a connecter A. This connecter A also provides means for securing one end of a cross chain $3'$ to the side chain 2. With this arrangement, in the event that the wheel is in a rut or the like so that it is not possible to lay the chain on the ground and then roll the wheel thereonto, the side chain 1, as shown in Fig. 1, may be laid at one side of the wheel, preferably on the inner side, and then, with the cross chain $3'$ lying in an out of the way position, the two ends of the sections $c$ and $d$ are joined together on the opposite side of the tire by means of the connecter A. The ends of the anti-skid chain are then hooked together, after which power may be applied to the wheel to extricate the car from the rut or other difficulty. Thereafter, without removing the chain from the tire, the hook of the cross chain is hooked over the shank of the connecter.

My improved connecter A for securing the sections $c$ and $d$ of the side chain 2 and the cross chain $3'$ together has a shank portion 10 provided at one end with an eye or circularly formed hook 11 and at the other end with an elongated hook portion 12. If desired, the connecter may be cast, but, preferably, it is formed from a piece of round stock cut to the desired length and then having its ends bent over towards each other. The free end of the eye 11 is sufficiently close to the shank portion 10 to prevent the end link c' of the chain section c from becoming detached therefrom; that is to say, the space 13 is smaller than the diameter of the stock of which the link c' is formed. This link c' may be of any suitable construction but is here shown, by way of illustration, as being formed of a wire or rod bent back on itself and having its ends bent back on themselves so as to provide a pair of eyes through which the eye 11 is threaded. The hook portion 12 is adapted to detachably receive the link d' of the other section d of the chain 2. The shank of the connecter below the space 16 between the ends of the hook portion 12 and the eye 11 is flattened out as at 14 so that it is of less thickness than width. The cross chain 3' has a hook 15 at its end which may be formed of a metal rod bent back upon itself to form a loop adapted to receive the end link of the cross chain, and the ends of the rod are turned back so as to form a hooked portion 15'. The entrance or throat of this hooked portion, that is the space between the free ends of the rod and the body portion thereof, is slightly greater than the thickness of the flattened portion 14 of the shank of the connecter so that the hook 15 will slip over the flattened portion of the shank when the connecter is in the position shown in Fig. 4. The flattened portion of the shank is greater in width than the throat of the hooked portion 15' so that when the parts are in the position shown in Fig. 3, the hook cannot become disengaged from the connecter. The space 16 between the eye 11 and the free end of the hooked portion 12 is preferably less than the width of the hooked portion 15' so that when the parts are assembled, the hook 15 will prevent the link d' from becoming disengaged from the connecter, as shown by dotted lines Fig. 2.

From the foregoing description, it will be seen that to join the hook 15' of the cross chain to the connecter, after the anti-skid chain, as a whole, has been applied to a wheel, it is merely necessary to swing the cross chain in position over the tire, turn the connecter to the position shown in Fig. 4, and then slip the hook over the flattened portion of the connecter. When the connecter is released, it will swing back into the position shown in Fig. 3; that is, it will be in a plane which is parallel to the plane of the wheel. When it is desired to disconnect the chain at the connecter, the latter is turned to the position shown in Fig. 4, the hook 15 is disengaged therefrom, and then the link d', the hook 15 being out of the way, can be disengaged from the connecter.

It is clear that my improved hook is of very simple form and, therefore, may be manufactured and sold at a very low cost. By its use, the several portions of the chain will be connected together in a short space of time and with little or no inconvenience; also, they may be just as readily detached from the connecter. After the parts have been assembled, accidental detachment cannot take place. The hook 15 closes the throat 16 of the connecter so that the link d' cannot slip through this throat. The hook 15 cannot become disengaged because the flattened portion 14 of the connecter is of greater width than the throat of the hook and also because the space between this flattened portion and the free end of the hooked portion 12 is less than the distance from the end of the hook 15 to the throat of that hook.

I claim as my invention:

1. A connecter for joining together two sections of a chain and a cross chain and comprising a shank portion having an elongated hooked portion at each end, said hooked portions being adapted to respectively receive links on the ends of the chain sections, the ends of said hooked portions of said connecter being spaced apart at a less distance than the width of the hook of the cross chain, whereby said hook prevents the link associated with at least one of said hooking portions from disengaging therefrom.

2. In combination, a pair of links and a hook, of a connecter comprising a shank having a hooked portion at each end, one of said hooked portions being adapted to receive one link, the other hooked portion the other link, and said shank said hook, the ends of said hooked portions being spaced apart at a distance less than the width of said hook, and said shank portion being flattened so that, in thickness, it is less than the throat of the hook and in width it is greater than the throat of the hook.

3. A connecter for joining together two sections of a chain and a cross chain and comprising a shank portion having an elongated hooked portion at one end and an eye at the other end, said eye adapted to receive a link on one of said chain sections, said elongated hook adapted to receive a link on the other of said sections, and said shank being adapted to receive a hook on the cross chain, the ends of said eye and hooked portion of said connecter being spaced apart at a less distance than the width of the hook of said cross chain, whereby said hook prevents the link associated with said hooked portion being disengaged therefrom.

4. In combination with an anti-skid chain comprising a pair of side chains one of which is in two sections and a cross chain having a hook at one end, of a connecter having a shank portion with an eye at one end and a hooked portion at the other end, said eye being adapted to receive a link on one of said sections, said hooked portion adapted to detachably receive said hook of said cross link, said shank being flattened so that it is of less dimension in the plane of the hook than in a plane transverse thereto, the space between said eye and the end of said hooked portion being less than the width of said hook, whereby said hook is prevented from detachment from said connecter when the latter is in a predetermined angular position relative thereto and said hook prevents the link associated with said hook portion from being accidentally detached therefrom.

FENELON McCOLLUM, Jr.